United States Patent
Bieber et al.

(10) Patent No.: US 6,540,254 B2
(45) Date of Patent: Apr. 1, 2003

(54) PASSENGER GAS BAG PROTECTION DEVICE

(75) Inventors: Udo Bieber, Niedernberg (DE); Ralph Neupert, Kleinwallstadt (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/882,155

(22) Filed: Jun. 15, 2001

(65) Prior Publication Data

US 2001/0052691 A1 Dec. 20, 2001

(30) Foreign Application Priority Data

Jun. 16, 2000 (DE) ....................... 200 10 726 U
Jul. 13, 2000 (DE) ....................... 200 12 077 U
Dec. 28, 2000 (DE) ......................... 100 65 461

(51) Int. Cl.⁷ ............................................... B60R 21/16
(52) U.S. Cl. .................................. 280/732; 280/743.2
(58) Field of Search .......................... 280/728.2, 730.1, 280/732, 743.1, 743.2

(56) References Cited

U.S. PATENT DOCUMENTS

| | | | | |
|---|---|---|---|---|
| 4,449,728 A | * | 5/1984 | Pilatzki | 280/731 |
| 5,048,863 A | * | 9/1991 | Henseler et al. | 188/376 |
| 5,308,113 A | * | 5/1994 | Moriset | 280/743.2 |
| 5,362,101 A | * | 11/1994 | Sugiura et al. | 280/728.2 |
| 5,489,119 A | * | 2/1996 | Prescaro et al. | 280/730.1 |
| 5,520,409 A | * | 5/1996 | Saderholm | 156/85 |
| 5,678,858 A | * | 10/1997 | Nakayama et al. | 280/728.2 |
| 6,164,696 A | * | 12/2000 | Ellerbrok et al. | 280/729 |

FOREIGN PATENT DOCUMENTS

| | | |
|---|---|---|
| DE | 19749914 A1 | 5/1999 |
| WO | WO9734783 | 9/1997 |

* cited by examiner

*Primary Examiner*—Paul N. Dickson
*Assistant Examiner*—Faye M. Fleming
(74) *Attorney, Agent, or Firm*—Tarolli, Sundheim, Covell & Tummino L.L.P.

(57) ABSTRACT

The invention relates to a passenger gas bag protection device which comprises a gas bag which, in relation to an inflated state, has a rear wall and a front wall which includes a center section and onto which a passenger strikes in the case of an accident. The gas bag, from a viewpoint of the passenger, has a round outer contour with a specific width and height in the inflated state. The width of the outer contour distinctly exceeds the height. In the inflated state the front wall has a depression opening out to the outside in the manner of a slit. The slit runs in a direction of the width of the gas bag. A restraint means is provided and the depression is formed in that on inflation of the gas bag a center section of the front wall is prevented from moving by means of the restraint means.

2 Claims, 3 Drawing Sheets

PASSENGER GAS BAG PROTECTION DEVICE

TECHNICAL FIELD

The invention relates to a passenger gas bag protection device.

BACKGROUND OF THE INVENTION

Known gas bags for the protection of passengers often have, as seen from the viewpoint of a passenger to be restrained by the device, a round outer contour in the inflated state, the width of which distinctly exceeds its height. These gas bags have a substantially oval outer contour from the viewpoint of the passenger (i.e. a view onto the front wall) and are to have an as large a restraint surface as possible, i.e. as large a front wall as possible, onto which the occupant strikes in the case of restraint. When the occupant sits too close to the instrument panel, the central region of the front wall, hereinafter named the center section, may hit the occupant, because this section is the one which is accelerated the most.

In driver's gas bags there are already ideas to construct the center section as a depression, the center section of the front wall being permanently fastened on a circular area to the gas bag module. In this embodiment, in particular occupants sitting too close to the instrument panel are intended to undergo a safe restraint. The transfer of such designs for driver's gas bags to passenger gas bags, however, entails the following problem: The passenger gas bags have a distinctly greater depth than the driver's gas bags. Viewed from the side, the passenger gas bags in the inflated state have a shape which widens toward the occupant, i.e. the height of the gas bag constantly increases. If a circle area (center section) were now to be fastened permanently to the gas bag module, then it is to be expected that the depression widens towards the occupant in a funnel shape, whereby in the center of the front wall, however, a sufficiently large restraint area would not be available, if the occupant has the desired central sitting position.

BRIEF SUMMARY OF THE INVENTION

The invention provides a passenger gas bag protection device which is distinguished by a good restraint of occupants sitting too close to the instrument panel and also a good restraint with a passenger sitting centrally. This is achieved in a protection device which comprises a gas bag which, in relation to an inflated state, has a rear wall and a front wall which front wall includes a center section and onto which a passenger strikes in the case of an accident. The gas bag, from a front view, i.e. a viewpoint of a passenger to be restrained by the device, has a round outer contour with a specific width and height in the inflated state. The width of the outer contour distinctly exceeds the height. In the inflated state the front wall has a depression mouthing to the outside in the manner of a slit. The slit runs in a direction of the width of the gas bag. A restraint means is provided and the depression is formed in that on inflation of the gas bag a center section of the front wall is prevented from a free movement outwardly by the restraint means. In the protection device proposed, the passenger gas bag likewise has an annular inflation chamber with a depression. However, the depression is constructed in the manner of a slit at the transition to the part of the front wall which is visible from the exterior, this construction permitting the upper and lower sections of the annular chamber to move towards each other and to touch each other, so that the front wall in the inflated state presents itself almost completely closed to the occupant, although the depression is still present.

According to the preferred embodiment, the gas bag is part of a gas bag module. A module covering closing the module is opened on inflation of the gas bag. The center section is fastened to the module by means of the restraint means beneath a part of the module covering, so that the module covering does not have to be swung outwards completely, but rather can remain in the region over the center section. The area of the module covering which is constructed as a flap can therefore be smaller than in the prior art, which reduces the deceleration values through the module covering which is to be swung up.

Preferably, the module covering therefore opens an oval annular outlet opening for the gas bag on inflation.

The gas bag is preferably defined by a gas bag wall which comprises the front wall, the gas bag wall having a continuous sheet of fabric which forms a back wall, the front wall and the depression and which is closed at the side. Through this construction, the gas bag wall can consist of as few individual parts as possible. The lateral closing of the continuous fabric sheet can take place on the one hand in that its edges are sewn and on the other hand in that on the side separate side walls are provided which are connected with it.

The closing of the depression preferably takes place by limiting straps adjoining the depression and provided inside the gas bag. The limiting straps are constructed so be so short that opposite wall sections of the depression contact each other in the inflated state of the gas bag and close the depression at least in sections.

DETAILED DESCRIPTION OF THE PREFERRED EMBODIMENTS

Figure 1:
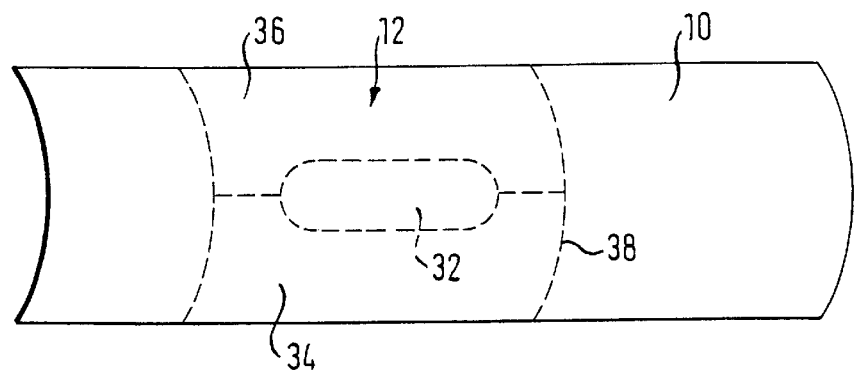
FIG. 1 shows a top view onto an instrument panel with a protection device according to the invention arranged therein.
Figure 2:
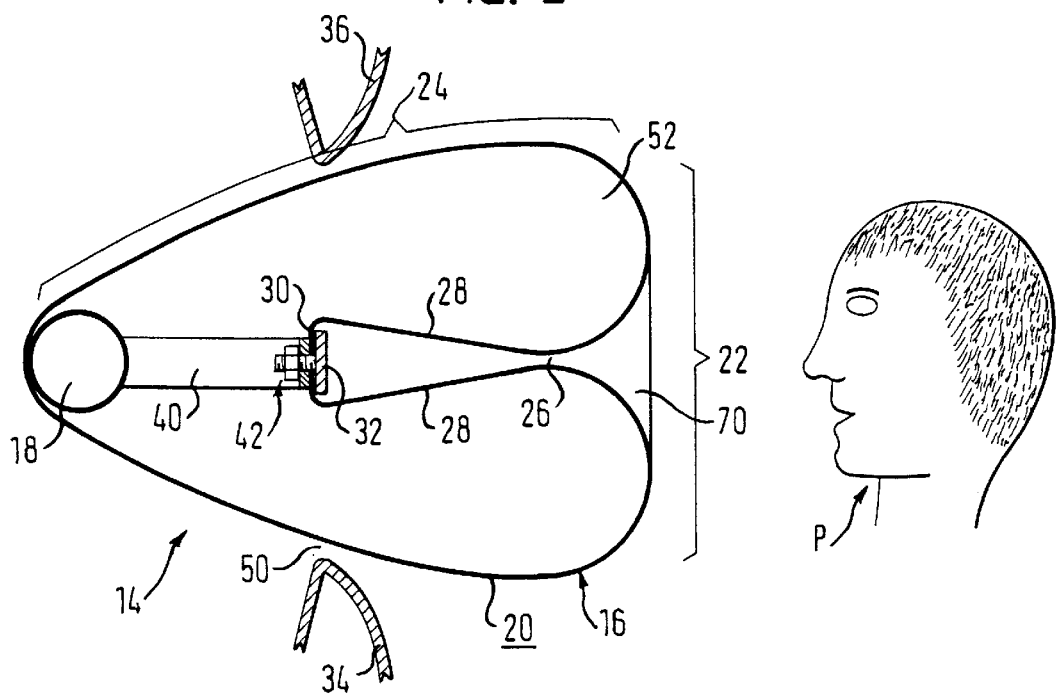
FIG. 2 shows a longitudinal sectional view through the protection device according to FIG. 1 with the gas bag inflated.

In FIG. 1 the instrument panel 10 is shown in the region of the passenger of a vehicle. A module covering 12 for a passenger gas bag protection device, incorporated in a concealed manner, is integrated into the instrument panel, more precisely into the covering which is visible from the interior. The protection device has a gas bag module 14 (see FIG. 2), which in the non activated state is closed by the covering 12. The gas bag module has a gas bag 16 and a gas generator 18 arranged inside the gas bag 16. The gas bag 16 is defined by a gas bag wall 20 consisting of several sections. One section is the so-called front wall 22, which faces the passenger P when the gas bag is inflated and onto which he strikes in the case of restraint. A rear wall 24 extends from the front wall 22 on all sides, which rear wall 24 extends to behind the gas generator 18. The front wall has a depression 26 which mouthes to the outside, the wall sections which form the depression being designated hereinbelow by 28. A center section, i.e. a central oval area section of the front wall 22, is designated by 30 and defines the "deepest" portion of the depression 26.

The module covering 12 likewise consists of various sections, namely an oval central part 32 and two pivoting flap sections 34, 36, which surround the central part 32. The central part 32 and flap sections 34, 36 are separated from each other by concealed tear-open lines 38. The central part 32 is permanently fastened to the module, so that it can not swing outwards like the flap sections 34, 36 on activation of the module. To fasten the central part 32, a bridge 40 extends from the gas generator 18 towards the central part 32. The central part 32 is screwed to the bridge 40 by means of a restraint means 42 in the form of screw/nut fastenings, the center section 30 being gripped between the central part 32 and bridge 40 and thereby being fastened permanently to the gas bag module. The center section 30 is congruent with the central part 32 lying thereabove.

Figure 3:
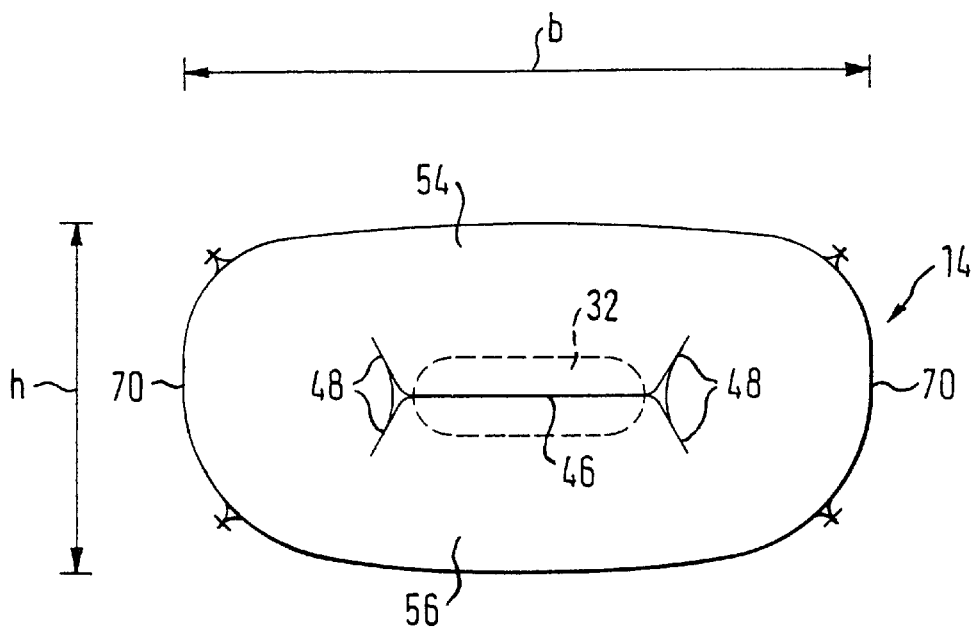
FIG. 3 shows a view, from the viewpoint of the passenger, onto the inflated gas bag of FIG. 2.

As can be seen in FIG. 3, from the viewpoint of the passenger the gas bag has a width b which distinctly exceeds the height h of the gas bag. Thereby, an almost oval, preferably even ellipse-shaped projection of the front wall is produced. The depression 26, in the inflated state and as seen from the viewpoint of the passenger, is an elongated horizontal slit 46, the depression 26 being substantially closed, however, by the opposite sections 28 of the gas bag wall touching each other, which is achieved by the cut of the gas bag. 48 designates folds which only possibly occur laterally, which originate from the slit 26 extending across a portion of the width b. Toward the center section 30, the depression 26 can also have a wall cross-section in the shape of a circular ring. At the opening to the annular part of the front wall 22, visible from the exterior, the depression is constructed in the manner of a slit and can also be seen from the exterior only as a slit or fold.

The mode of operation of the protection device is explained below. In a frontal impact, the gas generator 18 is activated and gas will expand inside the gas bag 16. The gas bag, which is folded substantially in an oval form around the bridge 40 and the central part 32, is inflated and presses the flap sections 34, 36 outwards, so that an annular outlet opening 50, e.g. in the shape of an oval ring, is produced, via which the gas bag largely leaves the module. The center section 30, however, is prevented from any movement during the inflation process, so that the depression 26 is produced, opening out in the manner of a slit. At the start of the unfolding process, the gas bag will unfold substantially obliquely radially outwards, which is advantageous for occupants sitting too close to the instrument panel. Finally, at the end of the inflation process, when the annular chamber 52 is almost fully inflated, the upper and lower parts 54, 56 of the chamber 52 will move towards each other and will close the depression 26, so that only the slit 46 is visible, i.e. an opening does not necessarily have to be present between the environment and the interior of the depression 26.

Figure 4:
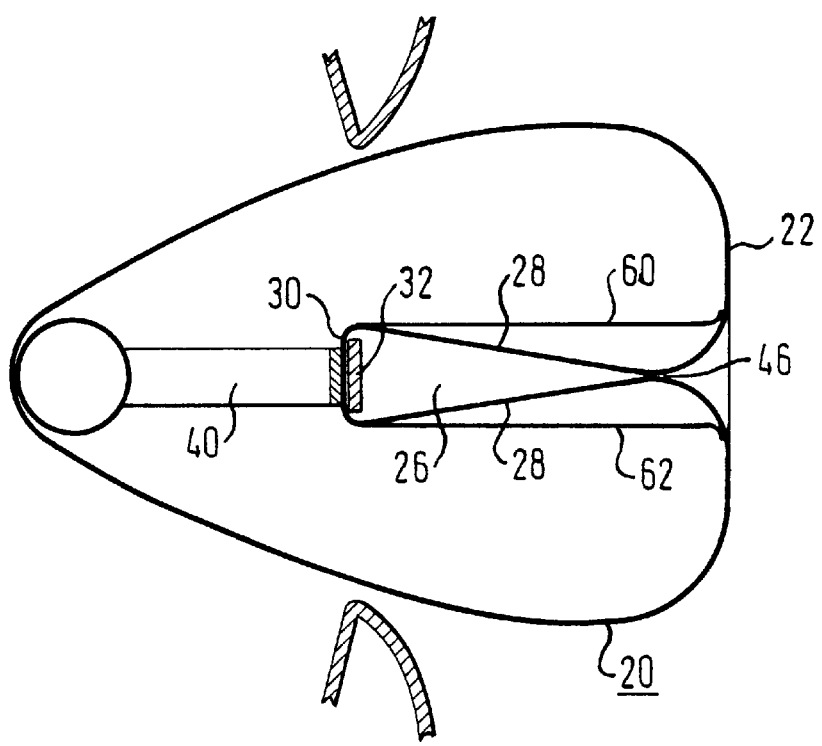
FIG. 4 shows a view according to FIG. 2 of a second embodiment of the protection device.
Figure 5:
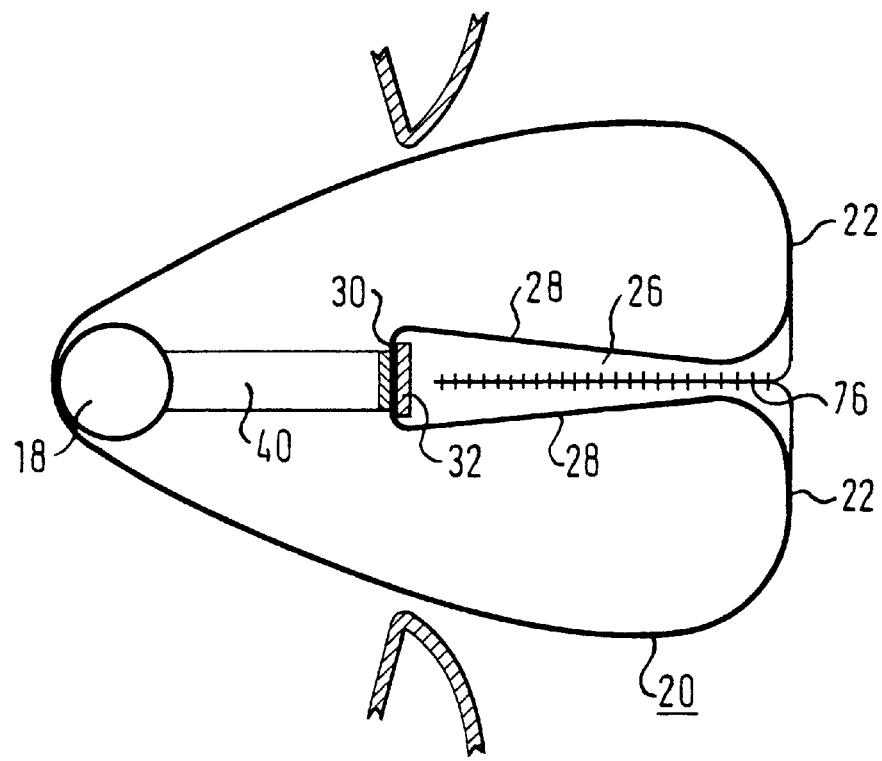
FIG. 5 shows a view according to FIG. 2 of a third embodiment of the protection device and FIG. 6 shows a view from the viewpoint of the passenger onto the gas bag of FIG. 5.
Figure 6:
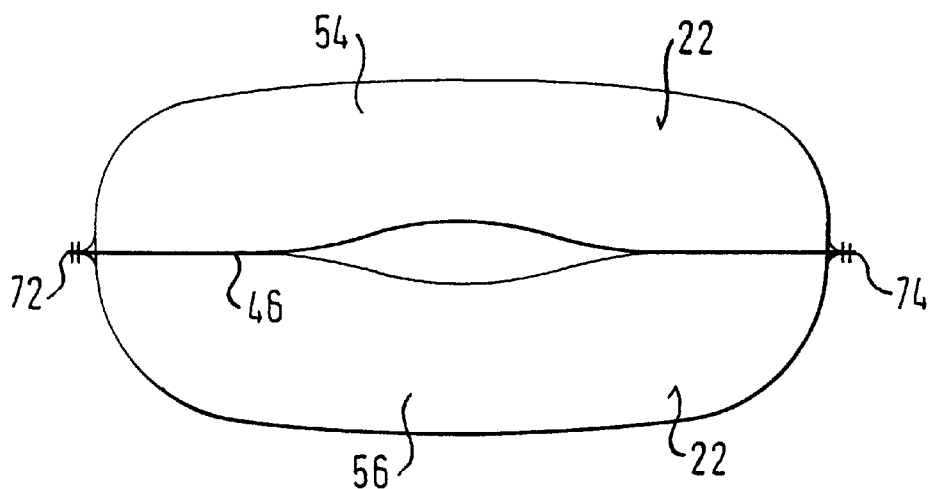

In the embodiments shown in FIGS. 4 to 6, in so far as parts have an identical function to parts already explained, the same reference numbers are also used.

The embodiment according to FIG. 4 differs from the preceding one in that immediately adjoining the sections 28 of the wall of the gas bag which form the depression 26, limiting straps 60,62 are provided inside the gas bag 16. The limiting straps are fastened by their ends on the one hand to the front wall 22 and on the other hand to the center section 30. Their length is selected to be distinctly shorter than the spacing of their fastening points on the gas bag wall, so that the sections 28 do not serve to delimit the gas bag 16 in depth, but rather can move towards each other, in order to close the depression 26 close to the front wall 22.

The gas bag of the protection device which is shown can be produced in various ways. For example, according to the embodiments according to FIGS. 1 to 4, a continuous fabric sheet, viewed in section according to FIG. 2, can extend from behind the gas generator 18 upwards, in order to form the rear wall 24, the upper part of the front wall 22, the upper section 28 of the depression 26, the center section 30, the lower section 28 of the depression 26, the lower part of the front wall 22 and the lower rear wall 24. On both sides of the fabric sheet, side walls 70 are connected with it, in order to close the gas bag.

Alternatively, however, the continuous fabric sheet, as illustrated in FIG. 5, can also be closed at the edges 72, 74 by sewing. A corresponding seam is shown in FIG. 5 by 76. Such as gas bag has the form shown in FIGS. 5 and 6, with a slit 46 extending across the entire width b, which can be easily opened at several places, but which is closed across the great majority of its longitudinal extent.

The bridge 40 could also be deformable, i.e. could absorb energy in a secondary impact after the collapse of the gas bag, by the bridge, for example, being formed from zigzag-shaped metal plates.

We claim:

1. A passenger gas bag protection device, comprising a gas bag which, in relation to an inflated state, has a rear wall and a front wall, which front wall includes a center section and onto which front wall a passenger strikes in the case of an accident, said gas bag, from a viewpoint of a passenger to be restrained by said device, having a round outer contour with a specific width and height in said inflated state, said width of said outer contour distinctly exceeding said height, said front wall in said inflated state having a depression mouthing to the outside in the manner of a slit, said slit running in a direction of said width of said gas bag and a restraint means being provided, said depression being formed in that on inflation of said gas bag said center section of said front wall is prevented from moving by said restraint means, wherein limiting straps are provided which adjoin said depression and are located inside said gas bag, said limiting straps being so short that opposite sections of said gas bag wall, which sections form said depression, contact each other and close said depression at least in sections.

2. An inflatable vehicle occupant protection device for mounting within an instrument panel of a vehicle, the inflatable protection device comprising:

an actuatable source of inflation fluid;

a gas bag for, upon actuation of the actuatable source, receiving inflation fluid and deploying outwardly of the instrument panel for helping to protect an occupant of the vehicle, the gas bag having a front wall that, when the gas bag is fully deployed, is presented for contact by the occupant, the front wall including a horizontally extending width and a vertically extending height, the width of the front wall exceeding the height of the front wall, the front wall further including a center section that is surrounded by a peripheral section of the front wall, the center section being fixed to a portion of the instrument panel and being prevented from moving during deployment of the gas bag, the peripheral portion, during deployment of the gas bag, moving outwardly of the instrument panel and relative to the fixed center section to form a depression in the fully deployed gas bag, the depression extending across the width of the front wall of the gas bag a distance greater than the depression extends across the height of the front wall.

* * * * *